United States Patent
Roche et al.

(10) Patent No.: US 9,037,757 B2
(45) Date of Patent: May 19, 2015

(54) DEVICE ACTION SERVICE

(75) Inventors: Graeme Andrew Kyle Roche, Seattle, WA (US); Allison O'Mahony, Bellevue, WA (US); Rachel Karin Popkin, Seattle, WA (US); Francisco Jose Garcia-Ascanio, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 35 days.

(21) Appl. No.: 12/963,157

(22) Filed: Dec. 8, 2010

(65) Prior Publication Data

US 2012/0151100 A1    Jun. 14, 2012

(51) Int. Cl.
*G06F 3/00*    (2006.01)
*G06F 13/10*    (2006.01)

(52) U.S. Cl.
CPC ........................... *G06F 13/10* (2013.01)

(58) Field of Classification Search
CPC ........................................................ G06F 13/10
See application file for complete search history.

(56) References Cited

U.S. PATENT DOCUMENTS

| | | | |
|---|---|---|---|
| 6,757,696 B2 | 6/2004 | Multer et al. | |
| 2003/0088866 A1* | 5/2003 | Boldon et al. | 717/170 |
| 2003/0191650 A1* | 10/2003 | Turner et al. | 705/1 |
| 2005/0125564 A1* | 6/2005 | Bushmitch et al. | 709/250 |
| 2008/0229335 A1* | 9/2008 | Robbin et al. | 719/328 |
| 2008/0235241 A1 | 9/2008 | Hattori et al. | |
| 2009/0178124 A1 | 7/2009 | Manion et al. | |
| 2010/0235757 A1* | 9/2010 | Kembel et al. | 715/745 |
| 2010/0250946 A1* | 9/2010 | Korte et al. | 713/175 |
| 2011/0119597 A1* | 5/2011 | Yellamraju et al. | 715/753 |

OTHER PUBLICATIONS

"Portal::Runtime pattern and Access Integration::Web Single Sign-On application pattern"—Published Date: Feb. 16, 2008, http://www.ibm.com/developerworks/patterns/portal/access-sso-runtime.html.
"Mobile Web Content Transformation Server (Transcoder)"—Retrieved Date: Aug. 12, 2010 http://www.novarra.com/solutions/open-internet-services-platform/.

(Continued)

*Primary Examiner* — Idriss N Alrobaye
*Assistant Examiner* — Ronald Modo
(74) *Attorney, Agent, or Firm* — Kevin Sullivan; Kate Drakos; Micky Minhas (57) ABSTRACT

A user may operate many devices, each of which may provide a set of actions, such as installing firmware or software or viewing the contents of the device. However, in order to perform these actions, the user may have to interact with each device using a different user interface, resulting in an inconsistent user experience. Instead, a device action service may allow a user to identify his or her devices, may identify the actions available for each device (e.g., by interacting with a device source of each device, such as a manufacturer); and upon the request of the user, may present a list of the user's devices and the actions available for each device. The actions may comprise hyperlinks to various portions of the website of the device source (e.g., a driver page and a service registration page), or controls invoking the requested action upon the device.

18 Claims, 7 Drawing Sheets

(56) References Cited

OTHER PUBLICATIONS

"ZeeVee Announces Anywhere, Any Device Access to Online TV With New, Cloud-Based Release of Zinc Internet Video Manager"—Retrieved Date: Aug. 12, 2010 http://www.prnewswire.com/news-releases/zeevee-announces-anywhere-any-device-access-to-online-tv-with-new-cloud-based-release-of-zinc-internet-video-manager-80898287.html.

"inXtron's Personal Cloud Server"—Retrieved Date: Aug. 12, 2010 http://www.inxtron.com/resources/articles/personal-cloud-server.

"Femtozone Applications & Services"—Retrieved Date: Aug. 12, 2010 http://www.airvana.com/technology/technology_1060.htm.

* cited by examiner

DEVICE ACTION SERVICE

BACKGROUND

Within the field of computing, many scenarios involve a set of devices operated by a user, such as a mobile phone, a portable game device, and a portable media player. Each device may comprise a particular set of capabilities (e.g., a display of a particular size and quality; one or more input devices; a data store of a particular size; communication components, such as a network adapter, a cellular communication device, or a global positioning service (GPS) receiver; and an operating environment comprising a set of applications, media objects, and user data objects). Each device may operate in isolation, or may interoperate with one or more other devices and data sources accessible over a network such as the internet.

With respect to these devices, a user may wish to perform various actions. As a first example, the user may wish to access the data store of a device, e.g., in order to view the data objects stored therein, or to upload or download new data objects to or from the device. As a second example, the user may wish to install a new hardware driver or software application on the device. As a third example, the user may wish to establish or perform an interoperation of the device with another device, e.g., establishing or performing a synchronization option to synchronize the data object in the data store of the device with equivalent data objects stored in the data tore of another device.

In order to perform these actions, the user often utilizes an administrative interface of the device. As a first example, in order to install a new software package or hardware driver on a workstation computer, the user may, using the workstation computer, visit a website of a distributor of the software package or hardware driver, download an installer package, and execute the installer package on the workstation. As a second example, the user may configure a first device using a second device; e.g., in order to upload one or more media objects to a portable media player, the user may download the media objects to a workstation computer, connect the portable media player to the workstation computer, and send the media objects from the workstation computer to the portable media player. As a third example, the user may subscribe a particular device to a service that the device may access through a communication device. For example, a user may subscribe to a chat service accessible over the internet, and may register a mobile phone device with the chat service in order to engage in chat sessions of the chat service with other users through the mobile phone (e.g., by installing a software chat client on the mobile phone). In this manner, the user may perform various actions upon the devices operated by the user.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A user of a set of devices that may be individually operated and administrated may encounter several disadvantages. As a first example, in order to identify his or her devices and exploring the device state of each device, the user may have to interact individually with each device. As a second example, in order to perform actions upon the devices, the user may have to operate each device in isolation (e.g., operating a first device to download and install thereupon a hardware driver or software application, and operating a second device to download and install thereupon the same or a different hardware driver or software application), and/or utilize loosely coupled interoperation of the devices (e.g., downloading the hardware driver or software application to a first device for delivery to and installation upon a second device). The isolation and/or loose interoperation of the devices may hamper the application of actions, such as the administration of the devices in order to synchronize data, by necessitating the use of different interfaces on different devices. For example, although several devices operated by the user may feature a similar set of actions (e.g., view contents, play media object, and install hardware driver), the user interface of the first device through which these actions are performed may be very different from the user interface on a second device for performing the same actions, and a third device may have to utilize another device in order to perform the same actions (e.g., in order to copy a media object to a portable media player, the user may have to download the media object to a workstation computer and then synchronize the media library of the workstation computer with the portable media player). The use of a plurality of divergent user interfaces to perform a standard set of actions on several devices may present an inconsistent and frustrating user experience for the user.

Presented herein are techniques for facilitating and improving the consistency of the performance of actions on a set of devices operated by a user. In accordance with these techniques, a device action service may be created to identify, for respective devices (e.g., for particular models of mobile phones, portable game devices, and portable media players), a set of actions that may be performed on the devices. For example, the device action service may, by communicating with a manufacturer of a particular model of mobile phone, determine that the mobile phone supports a set of actions comprising "activate mobile service," "install hardware driver," and "view address book." The manufacturer may also provide instructions for performing these actions; e.g., the activation of mobile service may be performed by visiting an activation web page of the website of the manufacturer; a hardware driver may be installed by downloading and executing a software package stored at a particular location of the website of the manufacturer; and the contents of the address book may be viewed by sending a particular signal to the mobile phone. Additional actions may be identified for other devices, and these actions may be stored in association with the devices in a data store. The device action service may then permit each user to identify the set of devices that the user operates, and may store the set of devices. The user may then request a presentation of the set of devices operated by the user. The device action service may present a list of the user's devices, including, for each device, a set of actions that may be performed on the device. The user may select the actions from the list in order to perform the corresponding actions on the device.

As compared with the conventional operation of the devices, the use of a device action service configured in this manner may present several advantages to the user. As a first example, instead of the user having to operate each device separately, the device action service may represent a centralized location where the user may identify and explore each of the devices operated by the user. As a second example, by providing access to the set of actions for each device in a unified user interface (e.g., a single web page listing the set of actions available for each device in a standardized manner, irrespective of the types of devices and/or actions involved), the device action service may present a more consistent and comprehensive user interface for the administration of the devices than may be presented by different user interfaces of different devices. As a third example, the device action service may be accessed on any device operated by the user, thereby presenting a consistent and comprehensive portal to the user's set of devices, regardless of which device the user operates to access the device action service.

Additional variations of these techniques may present still further advantages in the implementation of a device action service. As a first example, the device action service may be extensible, such that respective manufacturers may register new device types with the device action service and may provide updated sets of actions that may be performed thereupon. As a second example, for an unidentified device (e.g., a device for which the manufacturer cannot be determined or has not specified a set of actions for the device), the device action service may present to the user a set of generic actions that may be performed on the device. As a third example, the device action service may integrate the presentation of devices with services to which the user subscribes, and may permit the user to register devices with services. As a fourth example, the device action service may present to the user advertisements for products or services that may be available for the devices, and in particular, may present products and services based on a device state of a device (e.g., "your device is running low on storage space; would you like to subscribe to a cloud storage service in order to offload some data?") These and other advantages may be achieved through the design of the device action service to identify and offer actions available for devices operated by a set of users.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios may involve a user operating a set of devices. In particular, recent developments in mobile computing have yielded a wide range of portable devices, including notebook computers of various form factors, personal data assistants (PDAs), media players such as MP3 players and digital versatile disc (DVD) players, portable document readers, a wide range of mobile phones and other communication devices, digital cameras, and game devices. Additionally, the user may operate a series of non-portable devices, such as workstation computers, printers, home theater systems, media center devices, video recording equipment, network-attached storage (NAS) devices, home security and/or automation systems, and other networked appliances. Each device may be provided by a device source, such as a manufacturer, a retail distributor, an e-commerce site, or an administrator of an employer, organization, or academic institution to which the user belongs. Each device may also be of a particular device type (e.g., a particular device model that is offered by a manufacturer) and/or a device category (e.g., a class of devices having a similar set of capabilities, such as media player device category comprising devices that are capable of storing and rendering various forms of media, and a mobile phone device category comprising network-connected devices that are capable of initiating or receiving a voice communication session between two or more users of such devices).

The capabilities of each device may be presented to the user as one or more actions that are available for the device, and in order to operate the respective devices, the user may interact with the devices to request to perform one or more actions thereupon. For example, the user may interact with a mobile phone to request access to the set of contacts or to initiate or receive a call or simple messaging service (SMS) message; with a game device to install or play a particular game; and with a media player to view the media library stored on the device or to play a particular media object. The devices of a device category may also support a similar set of actions associated with standard device capabilities of the device category; e.g., any device within the device category of media players is likely able to support the "view media library" and "play media object" actions. Some actions may apply to a large set of devices of different device categories. For example, many devices featuring a data store may support a "view contents of data store" action, and many devices featuring an operating environment generated by a firmware stored on a flash memory device may support an "install firmware" operation. In order to perform a particular action on a particular device, the user may operate a user interface of the device. For example, a device of a particular device type may include a display component (such as a liquid crystal display (LCD)) and a set of hardware controls (such as buttons or a touch-sensitive display), and may present a user interface that allows the user to view available actions and select a desired action. In some such scenarios, the user may have to operate a first device in order to perform a desired action on a second device; e.g., in order to install firmware, a hardware driver, or a software package on a portable device having limited or no network connectivity, the user may have to download the firmware, hardware driver, and/or software package onto a network-connected device (such as a workstation computer), and then synchronize the latter device with the portable device in order to deliver the installable component.

Figure 1:
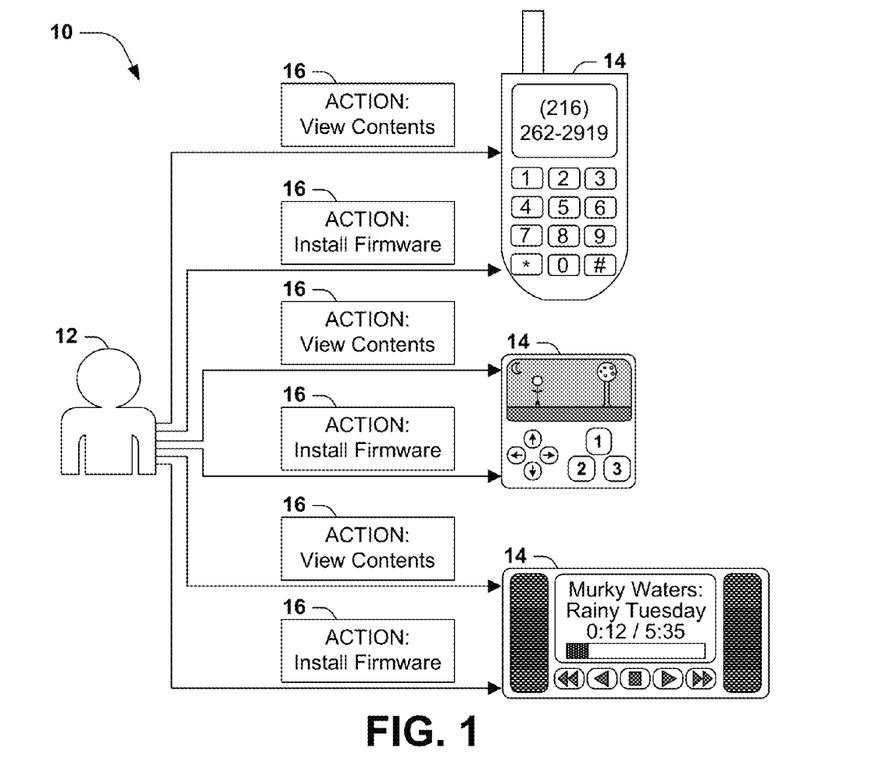
FIG. 1 is an illustration of an exemplary scenario featuring a user performing various actions upon a set of device.

FIG. 1 presents an illustration of an exemplary scenario 10 featuring a user 12 operating a set of devices 14, such as a first device 14 comprising a mobile phone, a second device 14 comprising a portable game device, and a third device 14 comprising a portable media player. Each of these devices 14 may provide a set of actions 16 that control various capabilities of the device 14, and in order to operate respective devices 14, the user 12 may request to perform various actions 16 related thereto. For example, the user 12 may request to view the set of contacts stored on the mobile phone device; to play a particular game on the portable game device; and to view or listen to a particular media object on the portable media player. Additionally, some actions 16 may be available on many devices 14, even if such devices 14 are not within the same device category; e.g., all three devices 14 in this diverse device set support an "install firmware" action 16 and a "view contents" action. Although the results of these operations may vary based on the device categories of the respective devices 14, such shared actions 16 may generally represent a similar behavior to be performed on each device 14.

The exemplary scenario 10 of FIG. 1 is frequently performed by users of a set of devices 14 (both mobile and stationary), in part because such devices 14 often operate in an isolated or loosely coupled manner. However, the incomplete or lack of coupling among the devices 14 may result in some disadvantages. As a first example, in order to administrate a particular device 14, the user 12 often has to perform the actions 16 on the actual device 14 (or a device 14 associated with it, such as a workstation computer configured to synchronize data with a portable media player), and cannot use any other device 14. If the user 12 does not have physical access to the device 14—e.g., if the device 14 is located in a different area—then the user 12 may be unable to configure the device 14. As a second example, the user 12 may have to operate the user interface of the device 14 in order to perform actions 16 thereupon; however, the user interface of a particular device 14 may be substantially or complete different from the user interfaces of other device 14 operated by the user 12. For example, a first device 14 may provide access to a set of actions 16 in a first user interface having particular characteristics (e.g., a text-based menu presented on an LCD and using buttons on the device to navigate the menu); a second device 14 may provide access to a set of actions 16 using a second user interface having particular characteristics (e.g., a graphical display having a touch-based interface to select graphical options); and a third device 14 may provide access to a set of options 16 using a third user interface having particular characteristics (e.g., a networked device that may be accessed from a web browser to present web pages including selectable actions 16). The widely divergent types of user interfaces presented by these devices 14 may significantly interfere with the efforts of the user 12 to administrate the devices 14. This interference may be particularly frustrating to the user 12, e.g., where the devices 14 are similar (e.g., widely divergent user interfaces among devices 14 in the same device category, and therefore having similar sets of capabilities), and/or where similar actions 16 are to be applied to the devices 14 (e.g., efforts to identify the amount of available storage space on each device 14 may involve completely different interactions with the user interfaces thereof).

Figure 2:
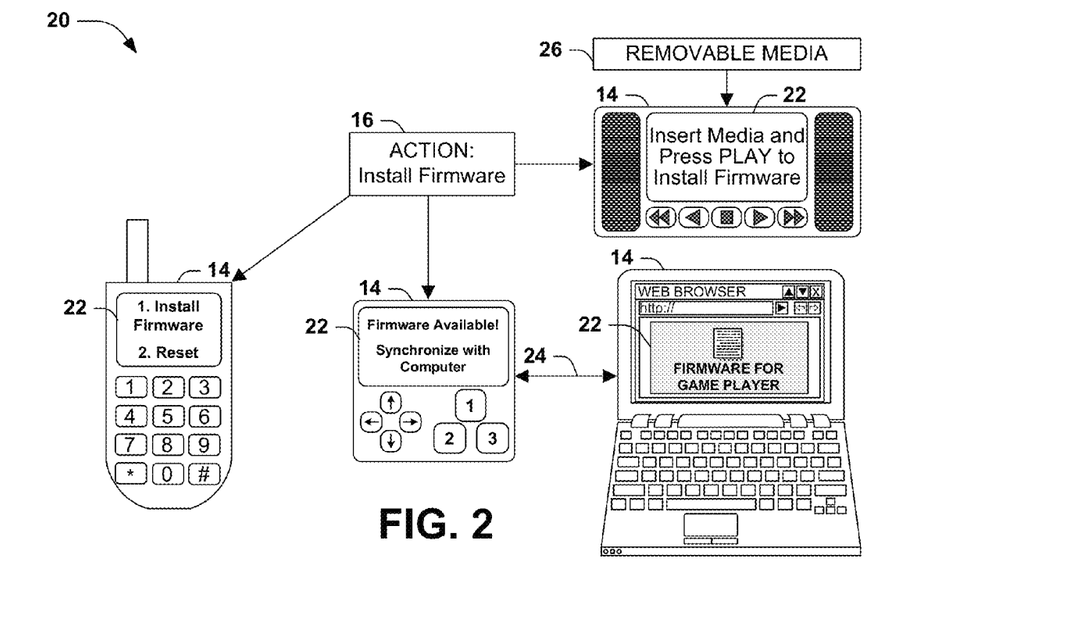
FIG. 2 is an illustration of an exemplary scenario featuring a variety of different user interfaces of various devices that may perform a desired action thereupon.

FIG. 2 presents an exemplary scenario 20 a user 12 who operates a first device 14 comprising a mobile phone, a second device 14 comprising a game device, and a third device 14 comprising a media player (as well as a fourth device 14 comprising a notebook computer). The user 12 may wish to apply a particular action 16 to each of the devices 14, such as installing a firmware update. In some such scenarios 20, a single firmware update may apply to two or more of the devices 14 (e.g., where the devices 14 are provided by the same device source, such as a single manufacturer, or where the firmware update applies to a diverse set of objects, such as an update to a software component that is widely deployed on many different devices 14). However, although the same action 16 is to be performed on all of the devices 14, the application of the action 16 may substantially differ from one device 14 to the next. For example, the first device 22 may provide a text-based menu for the user 12 to navigate in order to find and select an "install firmware" option, which may instruct the first device 22 to download the firmware update from the internet or from a cellular network (even if the user 12 has already downloaded the firmware update, e.g., using the notebook computer). The second device 22 may be configured to receive the firmware update on removable media 26, such as a flash memory device, and may request the user 12 to load the firmware update onto the removable media 26 and press a hardware button to install the firmware update. The third device 22 may apply the firmware update upon synchronizing with the notebook computer; e.g., the user 12 may have to use the notebook computer to use a web browser to visit a website 22 of the device source, download the firmware update, and then synchronize with the third device 14. In this manner, even though the user 12 seeks to perform the same action 16 on each device 14, the disparities among the user interfaces of the devices 14 may cause frustration and inefficiency.

Some efforts have been made to alleviate these disadvantages. As a first example, some recent developments seek to federate the set of devices 14 into a tightly coupled "mesh," where devices 14 are aware of the other devices 14 operated by the user 12, and may implicitly share and synchronize data with other devices 14 to provide a consistent user experience within a distributed computing environment, regardless of which device 14 the user 12 operates to access the computing environment. As a second example, a "control panel" or synchronization suite of a computer may permit the user 12 to administrate a variety of components associated with the computer, including various components with which the computer interfaces. However, these techniques involve comparatively tight coupling that may be difficult to implement; e.g., the user 12 may not have a device capable of serving as a centralized source of administration, particularly if the failure of such a device results in a loss of coupling among and impaired operability of the devices 14. Additionally, these techniques may still limit the administrative interoperability of the devices 14; e.g., the user 12 may utilize a control panel of a computer to administrate the devices 14 coupled thereto, but may not be able generally to perform actions 16 on a first device 14 using a second device 14, regardless of the relationship between the devices 14.

Presented herein are techniques for improving the experience of a user 12 seeking to perform one or more actions 16 upon devices 14. In accordance with these techniques, a device action service may be provided that may identify the devices of the user 12, and may present to the user 21 a set of actions 16 that may be performed upon respective devices 14. For example, the device action service may communicate with a wide variety of device sources (e.g., various manufacturers of various devices 14) and, for respective device types (e.g., the device models offered by a manufacturer), may identify a set of actions 16 that may be performed thereupon. Such actions 16 may include, e.g., references to web pages of the website of the device source where various actions 16 may be performed (e.g., a web page providing a firmware update and instructions for applying to the device 14, or a web page where users may activate a device 14 or register it with a service), such that when the user 12 selects the action 16, the corresponding web page of the website of the device source is displayed. Such actions 16 may also include, e.g., the actual application of the action 16 to the device 14. For example, a device source may provide to the device action service an executable binary or script that may be executed to implement a particular action 16 upon a device 14. The device action service may also permit a user 12 to register the devices 14 operated by the user 12, and may store the identified devices 14 for future use. When the user requests a presentation of the devices 14 operated by the user 12, the device action service may generate the presentation and send it to the user 12.

In addition to identifying and describing the devices 14 of the user 12 (e.g., the device source, device type, device category, and/or device state of the respective devices 14), the presentation may include a set of actions 16 that may be available for each device 14, based on the actions 16 that are available for devices 14 of the device type. The user 12 may be permitted to select an action 16 in relation to a device 14, and the device action service may facilitate the user in performing the action 16 (e.g., by presenting the web page of the device source of the device 14 that explains to the user 12 how to perform the action 16; by providing access to resources involved in the action 16, e.g., a download link to a firmware update; and/or may directly apply the action 16 to the device 14 (e.g., executing a script that targets and alters the device 14 to perform the action 16). In this manner, the device action service may improve the centralization and consistency of the performance of the actions 16 upon the devices 14 (e.g., by providing a single user interface that, in a consistent manner, lists the devices 14 and the actions 16 that may be performed thereupon). Additionally, the device action service achieves this centralization without involving the tight coupling and heavy configuration that may be involved in designating the devices 14 as a "mesh." These and other advantages may be achievable through the provision of a device action service and the use thereof to perform various actions 16 on the devices 14 of the user 12.

Figure 3:
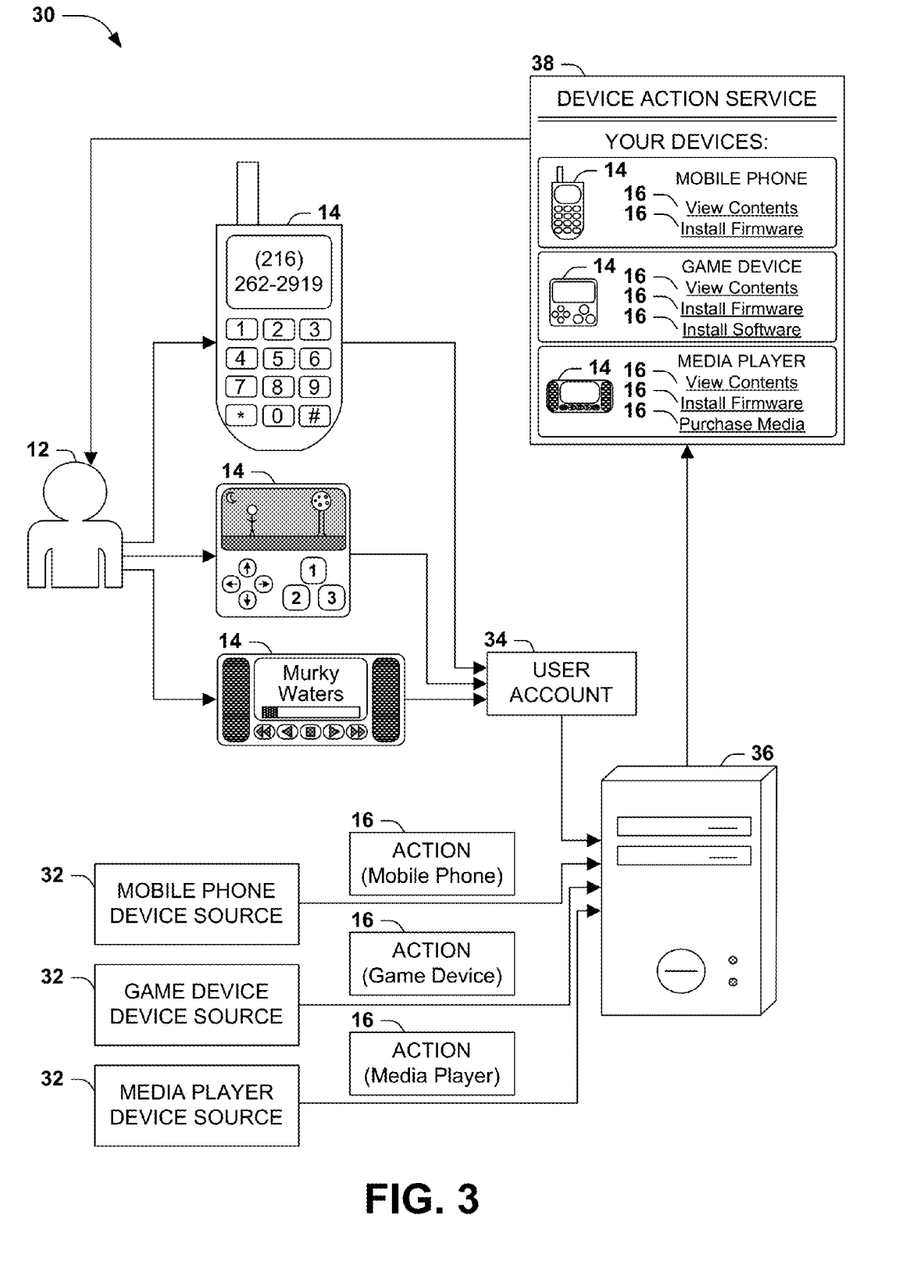
FIG. 3 is an illustration of an exemplary scenario featuring the application of actions to devices using a device action service in accordance with the techniques presented herein.

FIG. 3 presents an illustration of an exemplary scenario 30 featuring the use of a device action service to perform various actions 16 upon a set of devices 14 operated by a user 12. In this exemplary scenario 30, each device 14 may support a plurality of actions 16. Therefore, the device action service (provided, in this exemplary scenario 30, by a device action server 36) may communicate with one or more device sources 32 to identify the set of actions 16 that may be available for various device types (e.g., particular device models of the devices offered by each device source 32). The device activity service may therefore store the actions 16 (e.g., in a data store, such as a platter of a hard disk drive or as records in a relational database) associated with the device types provided by the respective device sources 32. Additionally, the device action service may permit the user 12 to create a user account 34, and may allow the user 12 to register with the user account 34 a set of devices 14 operated by the user 12 and of a particular device type, including a first device 14 comprising a mobile phone, a second device 14 comprising a portable game device, and a third device 14 comprising a portable media player. The device action service may therefore store the devices 14 in the data store. When the user 12 requests a presentation of the set of devices 14 registered with the device action service, the server 36 may generate and send to the user 12 a presentation 38 that identifies the devices 14 and the actions 16 that may be available for each device 14. The actions 16 might simply be presented to the user 12 (e.g., as recommendations for administrating the devices 14), may be selectable by the user 12 to view more information about the action 16 (e.g., where the action 16 is presented as a hyperlink to a web page of the device source of the device 14), and/or may actually perform the action 16 upon the device 14. In this manner, the device action service may facilitate the user 12 in performing actions 16 upon the devices 14.

Figure 4:
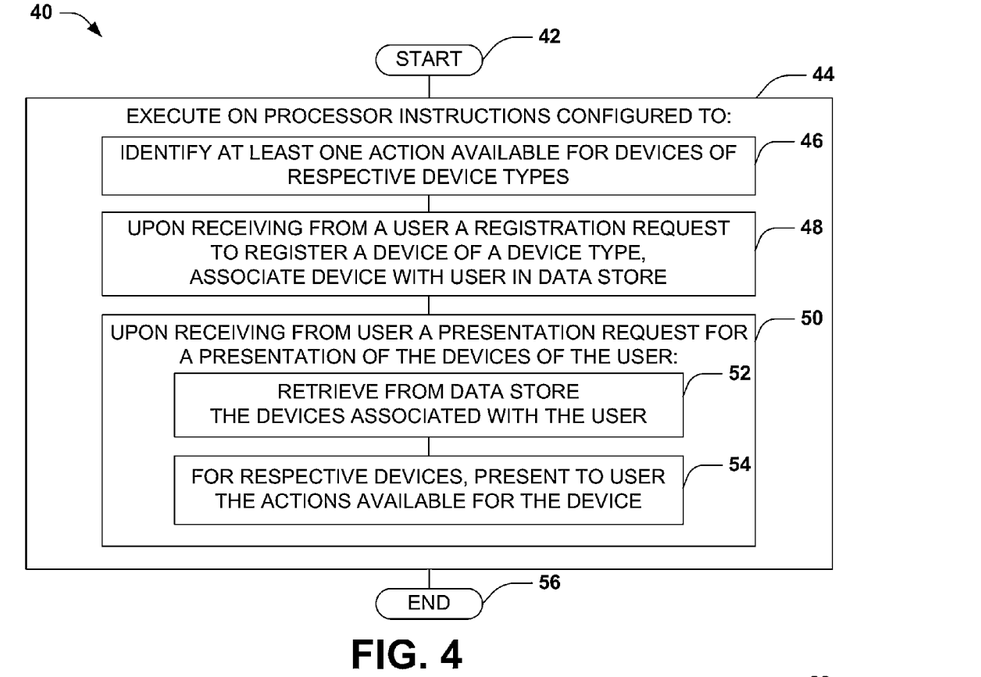
FIG. 4 is a flow chart illustrating an exemplary method of presenting to a user a set of devices operated by the user.

FIG. 4 presents a first embodiment of these techniques, illustrated as an exemplary method 40 of presenting to a user 12 a set of devices 14 operated by the user 12. The exemplary method 40 may be performed, e.g., using a computer having a processor and a data store, and may be implemented, e.g., as a set of software instructions stored in a memory component of the computer (e.g., a system memory circuit, a platter of a hard disk drive, a solid-state storage device, or a magnetic or optical disc), where the instructions are configured to, if executed by the processor, cause the computer to perform the techniques presented herein. The exemplary method 40 begins at 42 and involves executing 44 the software instructions on the processor. In particular, the software instructions are configured to identify 46 at least one action 16 available for devices 14 of respective device types. The software instructions are also configured to, upon receiving from a user 12 a registration request to register a device 14 of a device type, associate 48 the device 14 with the user 12 in the data store. The software instructions are also configured to, upon receiving 50 from a user 12 a presentation request for a presentation of the devices 14 of the user 12, retrieve 52 from the data store the devices 14 associated with the user 12, and, for respective devices 14, present to the user 12 the actions 16 available for the device 14. Having achieved the identification of the devices 14 of the user 12 and the presentation of actions 16 that may be performed thereupon, the exemplary method 40 causes the processor of the computer to perform the techniques presented herein, and so ends at 56.

Figure 5:
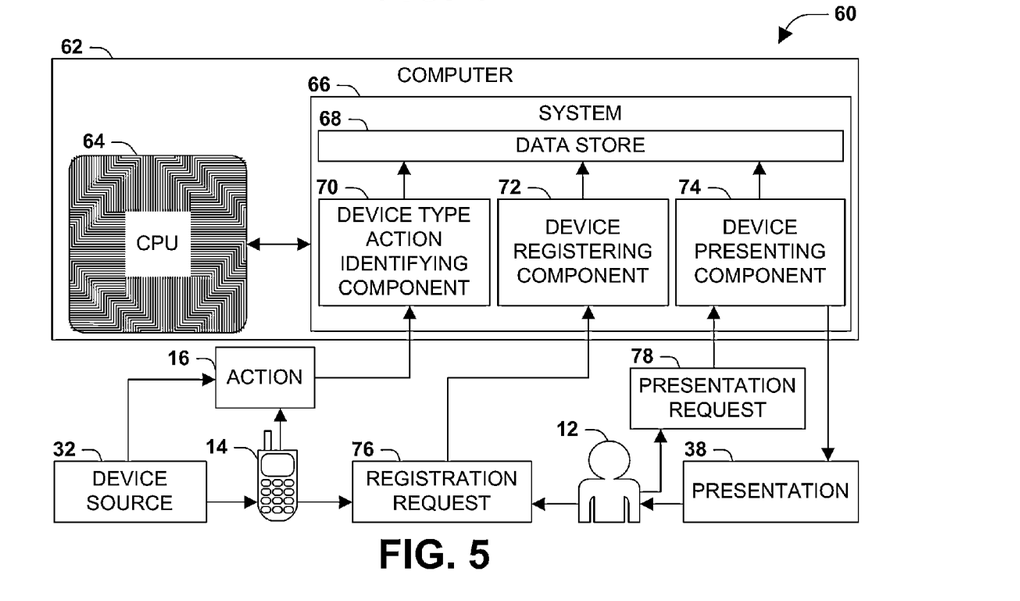
FIG. 5 is a component block diagram illustrating an exemplary system for presenting to a user a set of devices operated by the user.

FIG. 5 presents a second embodiment of these techniques, illustrated as an exemplary scenario 60 featuring an exemplary system 66 configured to present to a user 12 a set of devices 14 operated by the user 12. The exemplary system 66 is included in a computer 62 having a processor 64, and may be implemented, e.g., as a set of software components that interoperate to cause the processor 64 of the device 62 to perform the techniques presented herein. More particularly, the software components may comprise a set of instructions stored in a memory component of the device 62 (e.g., system memory, a platter of a hard disk drive, a solid-state storage device, or a magnetic or optical disc) that cause the processor 64 to perform a particular task, such that the software components, interoperating as provided herein, cause the device 62 to perform the techniques presented herein. In this exemplary scenario 60, the exemplary system 66 comprises a data store 68 configured to associate at least one user 12 with at least one device 14. The exemplary system 66 also includes a device action identifying component 70, which is configured to identify at least one action 16 available for devices 14 of respective device types (e.g., by receiving such actions 16 from a device source 32 of the device 14). The exemplary system 66 also includes a device registering component 72, which is configured to, upon receiving from a user 12 a registration request 76 to register a device 14 of a device type, associate the device 14 with the user 12 in the data store 68. The exemplary system 66 also includes a device presenting component 74, which is configured to, upon receiving from a user 12 a presentation request 78 for a presentation 38 of the devices 14 of the user 12, retrieve from the data store 68 the devices 14 associated with the user 12, for respective devices 14, present to the user 12 the actions 16 available for the device 14. By implementing these interoperating components, the exemplary system 66 present to the user 12 the set of devices 14 operated by the user 12 and the actions 16 that may be performed thereupon.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
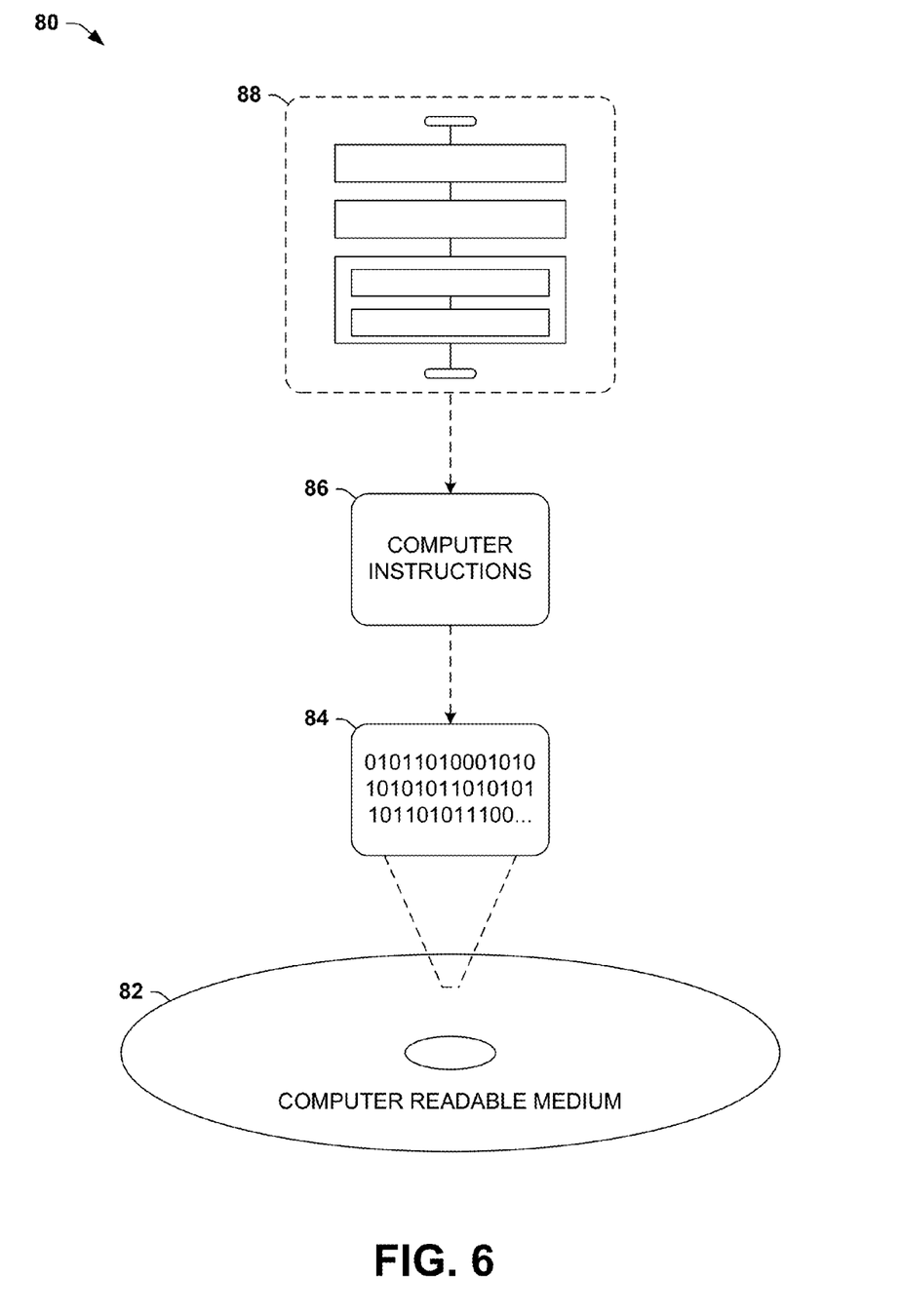
FIG. 6 is an illustration of an exemplary computer-readable medium comprising processor-executable instructions configured to embody one or more of the provisions set forth herein.

An exemplary computer-readable medium that may be devised in these ways is illustrated in FIG. 6, wherein the implementation 80 comprises a computer-readable medium 82 (e.g., a CD-R, DVD-R, or a platter of a hard disk drive), on which is encoded computer-readable data 84. This computer-readable data 84 in turn comprises a set of computer instructions 86 configured to operate according to the principles set forth herein. In one such embodiment, the processor-executable instructions 86 may be configured to perform a method of presenting to a user a set of devices operated by the user, such as the exemplary method 40 of FIG. 4. In another such embodiment, the processor-executable instructions 86 may be configured to implement a system for presenting to a user a set of devices operated by the user, such as the exemplary system 66 of FIG. 5. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 40 of FIG. 4 and the exemplary system 66 of FIG. 5) to confer individual and/or synergistic advantages upon such embodiments.

A first aspect that may vary among embodiments of these techniques relates to the scenarios wherein such techniques may be utilized. As a first example, these techniques may be used with a variety of devices 14, including various portable device (e.g., notebook computers of various form factors, personal data assistants (PDAs), media players such as MP3 players and digital versatile disc (DVD) players, portable document readers, a wide range of mobile phones and other communication devices, digital cameras, and game devices) and non-portable devices (e.g., workstation computers, printers, home theater systems, media center devices, video recording equipment, network-attached storage (NAS) devices, home security and/or automation systems, and other networked appliances). As a second example of this first aspect, these devices 14 may have been provided by a variety of device sources 32, such as a manufacturer, a retail distributor, an e-commerce site, or an administrator of a company, organization, or academic institution with which the user 12 is affiliated.

As a third example of this first aspect, many architectures may be selected for implementing these techniques. In a first such variation, the device action service may be implemented on a server (or set of servers) operating in the cloud, such that a user 12 may register a set of devices 14 with the service for presentation as a web page. In this variation, the user 12 does not have any ownership or administration of the servers; rather, the device action service is wholly provided to the user 12 by another organization, and the user 12 may interact with the device action service via a web browser. In a second such variation, one or more devices 14 of the user 12 may be involved in implementing some or all of these techniques. In this variation, one or more servers may be configured to store a representation of the devices of the user 12, but the presentation 38 may be partly or wholly generated by one or more devices 14 of the user 12. For example, a device 14 of the user 12 may interact with the service to retrieve the set of devices 14 operated by the user 12 and the actions 16 available therefor, and may prepare and present the presentation 38 of the devices 14 to the user 12 (e.g., by generating a web page including visual representations of the devices 14 and the actions 16). Many such architectures may be suitable for implementations the techniques presented herein.

As a fourth example of this first aspect, many types of actions 16 may be identified as available for such devices 14 (including a device action set of such actions 16), such as a software installing action (e.g., installing firmware or a firmware update, a driver for a hardware component, a patch for a software component, or an application); a data synchronizing action (e.g., creating, reading, updating, or deleting data stored on a device 14); a service registering action (e.g., registering the device 14 with a particular service); a device state viewing action (e.g., viewing a device state of a device 14, such as the contents of a data store of the device 14, the available capacity of the device 14, or the charge of a battery powering the device 14); and a device source visiting action (e.g., an instruction to visit a website associated with the device source 32 of the device 14). These actions 16 may also involve, e.g., presenting instructions to the user 12 for performing the action 16 on the device 14; providing resources to the user 12 involved in the action 16 (e.g., providing a firmware update to the user 12 for delivery to the device 14); and/or actually performing the action 16 on the device 14 (e.g., executing a script that alters the device in a particular manner). Those of ordinary skill in the art may devise many such scenarios wherein the techniques presented herein may be utilized.

A second aspect that may vary among embodiments of these techniques relates to the manner of identifying actions 16 available for devices 14 of a device type (e.g., for a particular device model offered by a device manufacturer). As a first example, the actions 16 may be provided by a device source of the device 14, such as a manufacturer, retail distributor, or e-commerce site that has provided the device 14 to the user 12. The actions 16 may also be specified by an administrator of a company, organization, or academic institution that has provided the device 14 to the user 12; e.g., a hospital may deliver to healthcare practitioners a set of devices 14 that are preloaded with healthcare software such as medical record database clients, and may specify a set of actions 16 that may be performed to administrate the devices 14 and/or assist the users 12 in understanding or utilizing the devices 14. Moreover, the device action service may extract the actions 16 from information that is generally provided by a device source 32, e.g., by (manually or automatically) scraping the actions 16 out of a web page of a website of the device source 32. Alternatively, the device action service may form a cooperative interaction with one or more device sources 32, such that the device sources 32 may directly inform the device action service of the actions 16 available for a particular device 14 or the devices 14 of a device type (e.g., by providing an extensible markup language (XML) document that specifically sets forth the set of actions 16 and the manner of performing respective actions 16). These actions 16 may be delivered in an active manner (e.g., the device source 32 may send push notifications to the device action service) and/or a in a passive manner (e.g., the device action service may poll the device source 32 to receive adjustments to the set of actions 16 available for a device 14). Moreover, upon receiving from a device source 32 a new action 16 that may be available for a device 14, the device action service may actively notify users 12 of the device 14 of the new action 16 that is available for the device 14. Such notification may be provided, e.g., as a pop-up notification (such as an instant message), as a less intrusive notification (such as an email message), and/or as a notification sent to the actual device 14 (e.g., as a simple message service (SMS) message sent to a mobile device).

As a second example of this second aspect, for some devices 14, it may be not be possible to receive from a device source 32 the actions 16 that are available. For example, the device source 32 may be unidentified, may have become nonexistent (e.g., a device 14 produced by a defunct technology company), may be temporarily or permanently offline, or may simply not cooperate with the device action service. In such cases, the device action service may be requested to register for a user 12 an unidentified device that does not have an association with a device source 32, and to generate a presentation 38 including actions 16 that may be available for the device 14. Accordingly, the device action service may be configured to associate with the unidentified device 14 at least one generic action that may be available for the unidentified device 14. As a first variation, the device action service may provide a set of generic actions 16 that are applicable to all devices, such as registering, deregistering, connecting to, disconnecting from, and naming or renaming the device 14 associated with the user account 34 of the user 12. As a second variation, the device action service may query the device 14 to identify various properties (e.g., does the device 14 provide a response if queried as a webserver?), and may associate with the unidentified device 14 various actions 16 corresponding to the properties of the device 14 (e.g., "query this device as a webserver"). As a third variation, the unidentified device 14 may be identifiable as belonging to a particular device category, e.g., a storage device, a media capturing device, or a media rendering device. The device action service may therefore identify one or more actions 16 that are often available for devices 14 within the device category, and may associate such actions 16 with the device 14.

Figure 7:
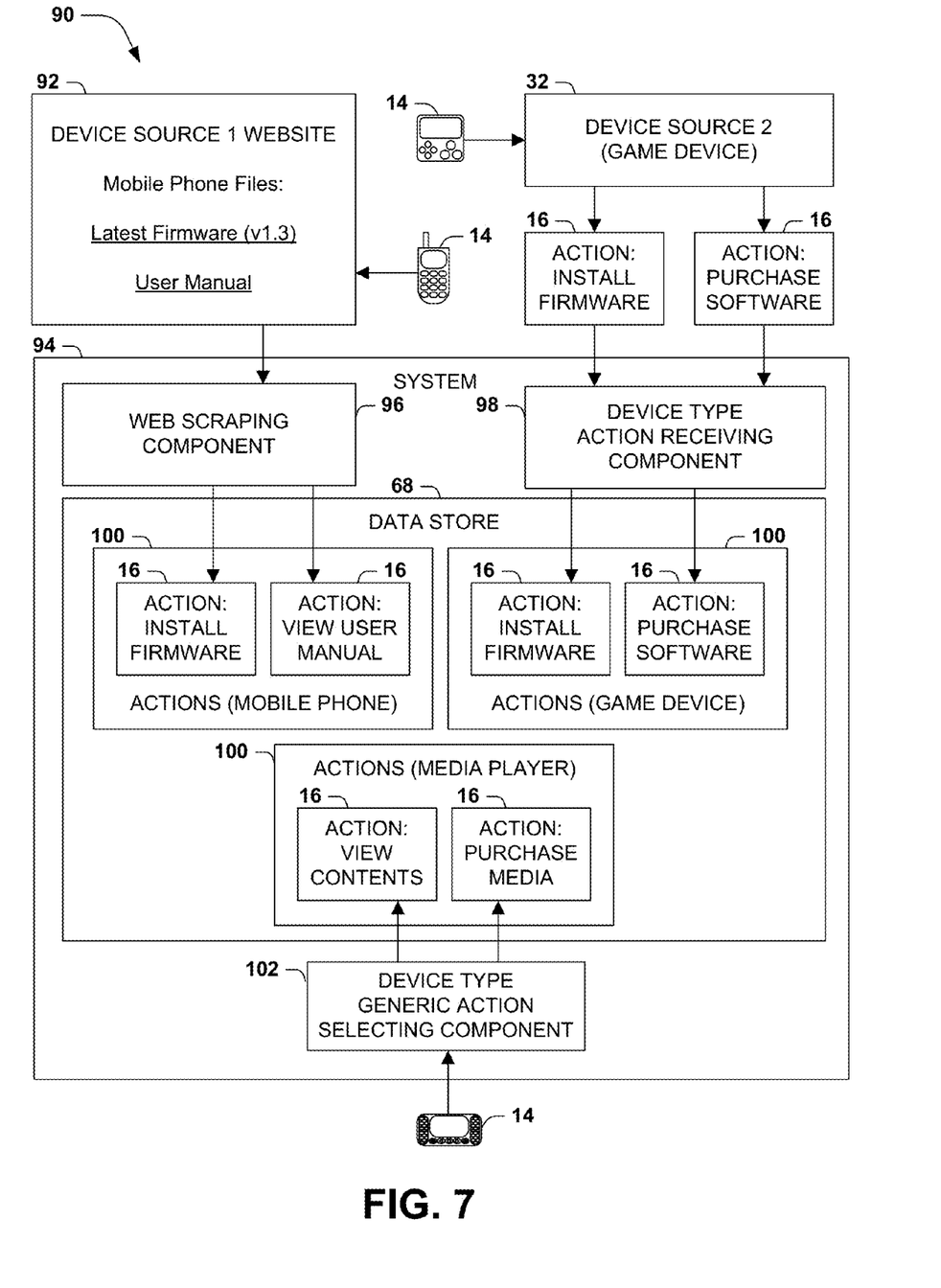
FIG. 7 is an illustration of an exemplary scenario featuring an association with a device of actions received from various device sources.

FIG. 7 presents an exemplary scenario 90 featuring an identification of actions 16 that may be available for respective devices 14 of particular device types. In this exemplary scenario 90, an exemplary system 94 (such as the exemplary system 66 in the exemplary scenario 60 of FIG. 4) may be configured to identify (and to store in a data store 68) a set of actions 16 for one or more device types, in case a user 12 subsequently requests to register a device 14 of such a device type with the exemplary system 94 and to receive a presentation 38 of the actions 16 available therefor. Accordingly, the exemplary system 94 may communicate with a first device source 32 by extracting actions 16 for a device type from the information provided by the first device source 32. In particular, the first device source 32 may provide a web page 92 wherein such actions 16 are identified (e.g., as a set of hyperlinks to various resources and actions 16 relevant to a device 14 of the device type), and may invoke a web scraping component 96 to extract the actions 16 from the web page 92 of the first device source 32 and store such actions 16 in the data store 68. The exemplary system 94 may also communicate with a second device source 32 that actively notifies the system 94 of actions 16 available for one or more device types, and may therefore include and invoke a device type action receiving component 98 to receive the actions 16 from the second device source 32 and to store such actions 16 in the data store 68. The exemplary system 94 may also be configured to identify a set of actions 16 for a particular type of unidentified device 14 (e.g., an unidentified device 14 that a user 12 has previously requested to be associated with a user account 34). The exemplary system 94 may therefore include a device type generic action selecting component 102 that, for a particular unidentified device 14, identifies and stores in the data store 68 a set of actions 16 that may be available for the device 14. In this manner, the exemplary system 94 may identify and store in the data store 94 a suitable set of actions 16 for many device types that various users 12 may request to register with user accounts 34.

As a third example of this second aspect, instead of generally identifying actions 16 that may be available for all devices 14 of a device type provided by a device source 32, an embodiment of these techniques may specifically identify the actions 16 available for a particular device 14. As a first variation, a device 14 of a user 12 may have a particular device identifier, such as a distinctive code that identifies the device 14 to the device source 32 (e.g., a serial number). The device action service may therefore identify the actions 16 available for the device 12 by communicating directly with the device source 32, e.g., by sending the device identifier of the device 14 to the device source 32 and requesting the actions 16 that are available for the device 14. This variation may be advantageous, e.g., because the device source 32 may have more particular information about the device state of the device 14 and/or the actions 16 that are available therefor (e.g., the actions 16 that the user 12 and/or device 14 are authorized to perform upon the device 14). As a second variation, the user 12 may be associated with a service, such as a chat service, a media sharing service, or a communications provision service. The device action service may identify the actions 16 available for a device 14 of the user 12 by requesting from the service the actions 16 available for the device 14 (e.g., the chat functions, media sharing functions, and/or connectivity that the service may authorize for and may be capable of extending to the device 14), and upon receiving from the service the actions 16 available for the device 14, associating the actions 16 with the device 14 in the data store 68. Those of ordinary skill in the art may devise many ways of identifying the actions 16 available for a particular device 14 (including for all devices 14 of a device type and/or device category) while implementing the techniques presented herein.

A third aspect that may vary among embodiments of these techniques relates to the manner of allowing a user 12 to register a device 14 for association with the user account 34 of the user 12. As a first example, the user 12 may simply specify the devices 16 that are operated by the user 12 (e.g., by filling out a form of the device action service that identifies and/or describes the device 16). As a second example of this third aspect, the devices 16 may be automatically detected and reported to the device action service. In a first variation, the user 12 may utilize a particular presentation device to interact with the device action service (e.g., a computer having a web browser that the user 12 uses to visit a website of the device action service), and the presentation device may be configured to detect the devices 14 of the user 12 and report such devices 14 to the device action service. In a second variation, the presentation device may identify itself to the device action service, and may automatically be registered by the device action service as a device 14 of the user 12. As a third example of this third aspect, the registration request 76 to register a device 14 with a user account 34 of a user 12 may be received from the device source 32 providing the device 14 to the user 12 (e.g., by the manufacturer upon receiving a warranty registration of the device 14 completed by the user 12; by a retail distributor or e-commerce site upon selling the device 14 to the user 12; or by an administrator of company, organization, or institution affiliated with the user 12 upon provisioning the device 14 for the user 12). As a fourth example of this third aspect, a particular device 14 may be shared among a plurality of users 12 (e.g., a device 14 shared by several members of a family), and the device action service may associate the device 14 with the respective user accounts 34 of the two or more users 12 of the device 14. Those of ordinary skill in the art may devise many ways of detecting and registering devices 14 on behalf of users 12 while implementing the techniques presented herein.

A fourth aspect that may vary among embodiments of these techniques relates to the presentation 38 to a user 12 of the devices 14 and actions 16 available therefor. As a first example, the presentation 38 may present actions 16 for respective devices 14 as a device source reference provided by a device source 32 (e.g., a uniform resource identifier (URI) of a web page of the website 92 of the device source 32 that informs the user 12 of how to perform a particular action 16, which may be presented in the presentation 38 as a hyperlink to the web page). Alternatively, the presentation 38 may include a user control that the user 12 may activate to generate an action request to perform the action 16 upon the device 14. For example, upon receiving the action request, the device action service may invoke an executable binary or script that communicates with the device 14 to perform the action 16.

As a second example of this fourth aspect, the presentation 38 may include additional information relating to the devices 14. As a first variation, the presentation 38 may include information about a device state of one or more devices 14, such as a set of applications installed on a device 14 or the versions thereof, an amount of storage capacity of a device 14 that has been consumed or that is available, or an available charge of a battery powering a device 14. This information may be relayed to the device action service and inserted into the presentation 38. For example, the device action service may be configured to receive a device state regarding respective devices 14 and store the device state in the data store 68 associated with the device 14, and while generating the presentation 38, retrieve the device state from the data store 68 and present the device state as part of the presentation 38. Alternatively, this information may be inserted into the presentation 38 after delivery to the user 14 (e.g., by supplementing the presentation 38 with information about the device states of devices 14 detected by the presentation device of the user 12). Additionally, the actions 16 presented with for a device 14 may relate to a current device state of the device 14 (e.g., offering a storage cleanup option for a device 14 having low storage capacity).

As a second variation, the presentation 38 may include in the list of devices 14 one or more services with which the user 12 subscribes, as well as various actions 16 that may be available for such services. For example, the presentation 38 may include a portable hard disk drive) and a set of storage actions related thereto (e.g., formatting or erasing the hard disk drive, viewing the contents of the hard disk drive, or synchronizing the hard disk drive with another data source), and may also include a cloud storage service and a similar set of actions 16 related thereto. This example may represent the service as a virtual device 14 on par with the physical devices 14 operated by the user 12, and with a consistent presentation of actions 16 for both classes of devices 14.

As a third variation, the presentation 38 may include one or more advertisements for products or services that may be relevant to the devices 16, such as a headset for a mobile phone device 14 or a new game that may be available for a game device 14. The advertisements may also relate to the device state of a device 14 (e.g., an advertisement for a sale of supplemental memory for a device 14 having a device state indicating low available memory).

Figure 8:
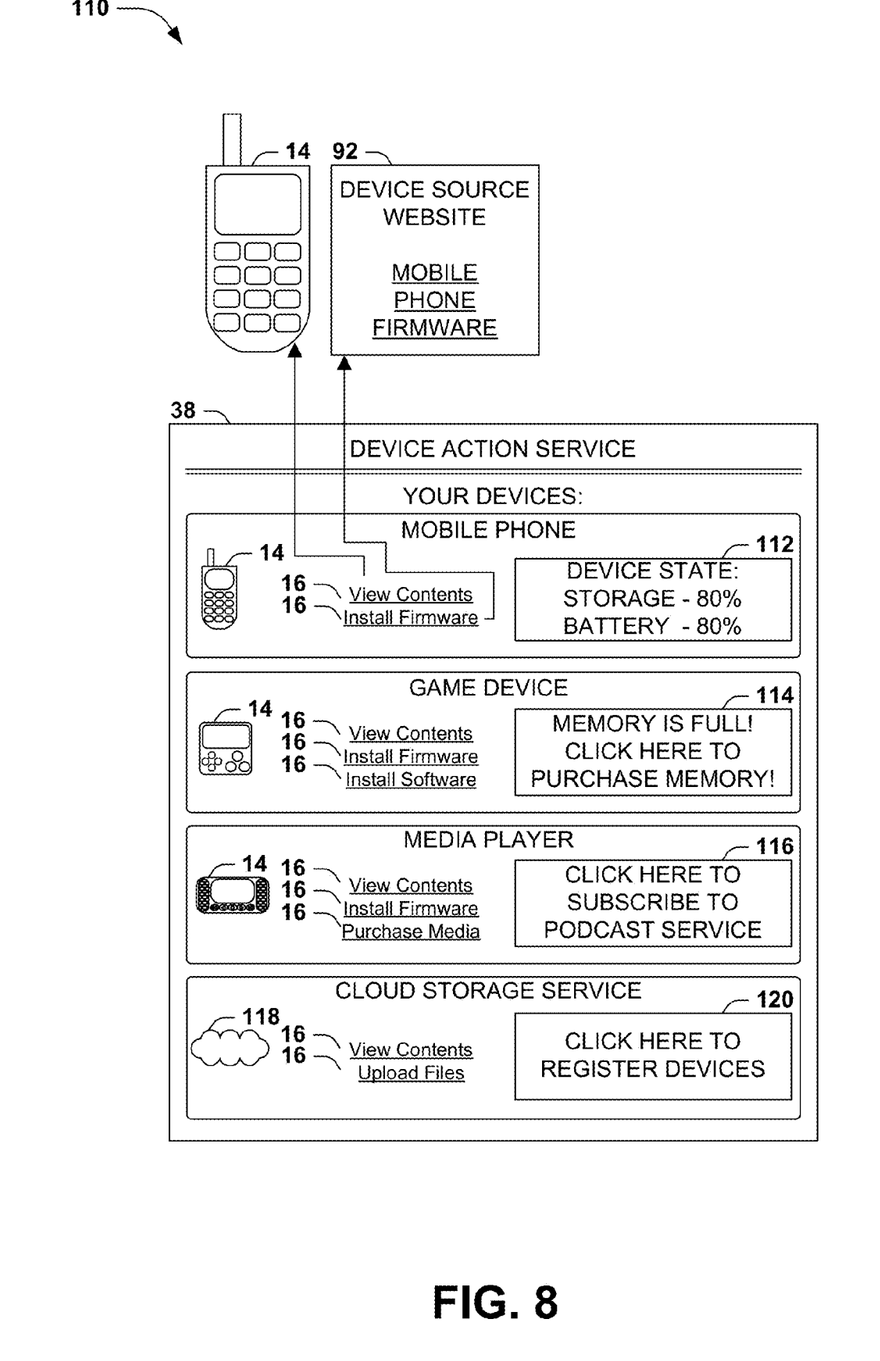
FIG. 8 is an illustration of an exemplary scenario featuring an exemplary presentation of actions available for the devices of the user.

FIG. 8 presents an illustration of an exemplary scenario 110 featuring a presentation 38 of devices 14 and actions 16 related thereto that incorporates several of these examples. The presentation 38 in this exemplary scenario 110 features several devices 14 and, for respective devices 14, a set of actions 16 that may be performed thereupon. As a first example, for a first device 14, a set of actions 16 are presented including a "View Contents" action 16 that is performed upon the device 14 (e.g., by invoking an operation upon the device 14 that causes the device 14 to disclose the contents of a data store, and then presenting the contents of the data store to the user 12), and an "Install Firmware" action 16 that comprises a device source reference that, upon activation, simply presents information provided by the device source 32 (e.g., a uniform resource identifier (URI) presented as a hyperlink to a web page including a firmware update, and possibly instructions for applying the firmware update to the device 14). As a second example, the presentation 38 includes, for the first device 14, a device state 112 presenting information about the state of the device 14. As a third example, the presentation 38 includes an advertisement 114 relating to a device state 112 of the second device 14 (e.g., an advertisement for more memory for the second device 14 that is presented because the device state 112 indicates a shortage of memory). As a third example, the presentation 38 includes an action 16 associating a device 14 with a service 116, such as a subscription to a podcast service that may provide additional actions 14 for the media player. As a fourth example, the presentation 38 includes, on par with the devices 14, a service 118 to which the user 12 may have subscribed (e.g., a cloud storage service that is presented as a virtual device, along with a set of actions 16 related thereto, in a manner consistent with the physical devices 14). In this manner, the embodiment in this exemplary scenario 110 of FIG. 8 supplements various aspects of the presentation 38 of devices 14 and actions 16 related thereto. Those of ordinary skill in the art may devise many such variations in the presentation 38 of devices 14 and actions 16 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
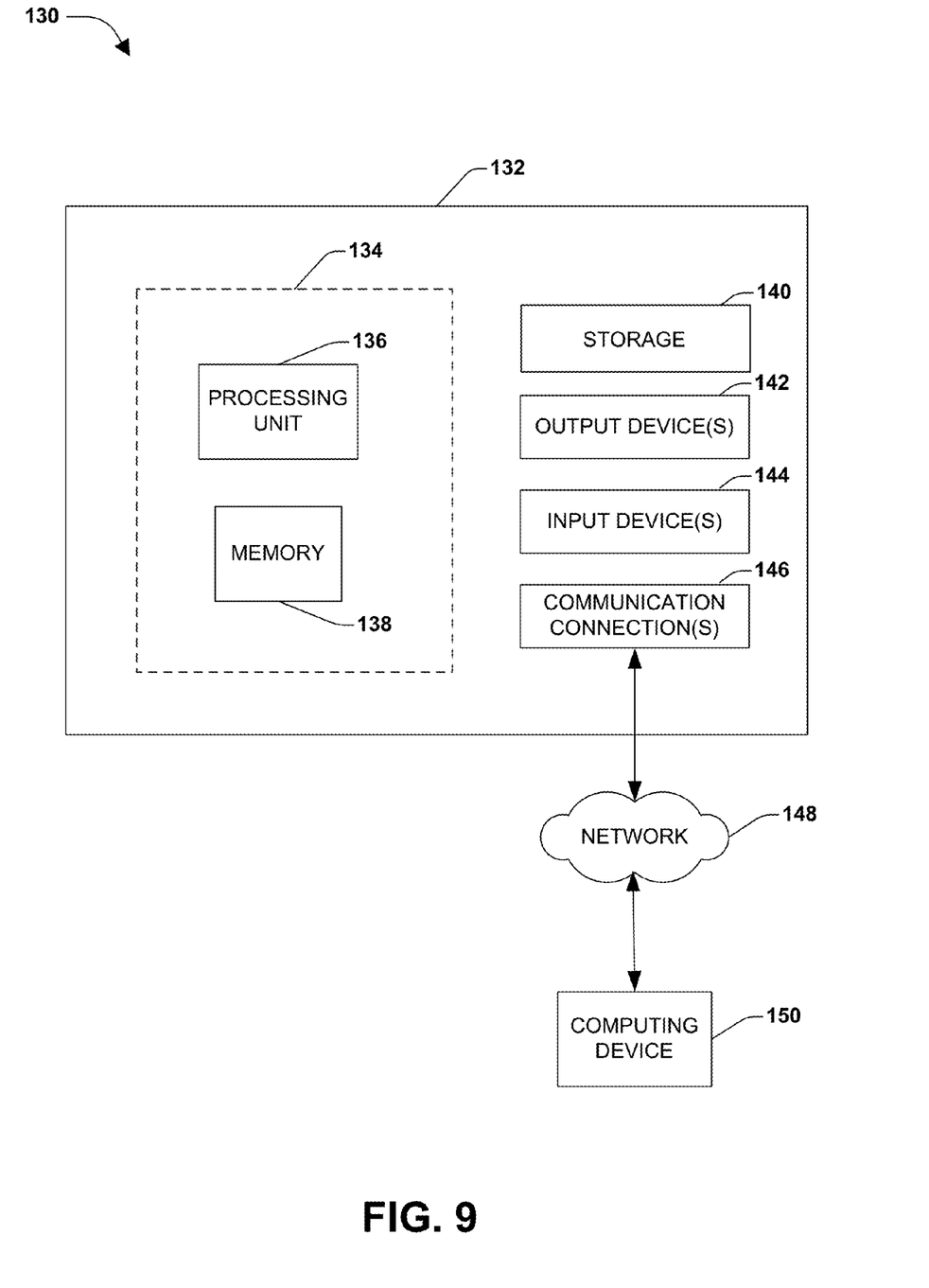
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 130 comprising a computing device 132 configured to implement one or more embodiments provided herein. In one configuration, computing device 132 includes at least one processing unit 136 and memory 138. Depending on the exact configuration and type of computing device, memory 138 may be volatile (such as RAM, for example), non-volatile (such as ROM, flash memory, etc., for example) or some combination of the two. This configuration is illustrated in FIG. 9 by dashed line 134.

In other embodiments, device 132 may include additional features and/or functionality. For example, device 132 may also include additional storage (e.g., removable and/or non-removable) including, but not limited to, magnetic storage, optical storage, and the like. Such additional storage is illustrated in FIG. 9 by storage 140. In one embodiment, computer readable instructions to implement one or more embodiments provided herein may be in storage 140. Storage 140 may also store other computer readable instructions to implement an operating system, an application program, and the like. Computer readable instructions may be loaded in memory 138 for execution by processing unit 136, for example.

The term "computer readable media" as used herein includes computer storage media. Computer storage media includes volatile and nonvolatile, removable and non-removable media implemented in any method or technology for storage of information such as computer readable instructions or other data. Memory 138 and storage 140 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 132. Any such computer storage media may be part of device 132.

Device 132 may also include communication connection(s) 146 that allows device 132 to communicate with other devices. Communication connection(s) 146 may include, but is not limited to, a modem, a Network Interface Card (NIC), an integrated network interface, a radio frequency transmitter/receiver, an infrared port, a USB connection, or other interfaces for connecting computing device 132 to other computing devices. Communication connection(s) 146 may include a wired connection or a wireless connection. Communication connection(s) 146 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 132 may include input device(s) 144 such as keyboard, mouse, pen, voice input device, touch input device, infrared cameras, video input devices, and/or any other input device. Output device(s) 142 such as one or more displays, speakers, printers, and/or any other output device may also be included in device 132. Input device(s) 144 and output device(s) 142 may be connected to device 132 via a wired connection, wireless connection, or any combination thereof. In one embodiment, an input device or an output device from another computing device may be used as input device(s) 144 or output device(s) 142 for computing device 132.

Components of computing device 132 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 132 may be interconnected by a network. For example, memory 138 may be comprised of multiple physical memory units located in different physical locations interconnected by a network.

Those skilled in the art will realize that storage devices utilized to store computer readable instructions may be distributed across a network. For example, a computing device 150 accessible via network 148 may store computer readable instructions to implement one or more embodiments provided herein. Computing device 132 may access computing device 150 and download a part or all of the computer readable instructions for execution. Alternatively, computing device 132 may download pieces of the computer readable instructions, as needed, or some instructions may be executed at computing device 132 and some at computing device 150.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting to a user a set of devices operated by the user, the method using a computer having a processor and access to a device action service, the method comprising:
    executing on the processor instructions configured to:
        upon receiving from a user a registration request to register a device, associate the device with the user;
        upon failing to identify an unidentified device associated with the user:
            identify at least one capability of the unidentified device;
            request from the device action service a set of actions invokable on devices having the at least one capability of the unidentified device; and
            upon receiving the set of actions from the device action service, associate the set of actions with the unidentified device; and
        upon receiving from a user a presentation request for a presentation of the devices of the user,
            present to the user the devices associated with the user and, for the respective devices, the set of actions associated with the device.

2. The method of claim 1, the actions available for a device selected from an action set comprising:
    a software installing action;
    a data synchronizing action;
    a service registering action;
    a device state viewing action; and
    a device source visiting action.

3. The method of claim 1:
    the user receiving the presentation on a presentation device; and
    the registration request received from the presentation device upon detecting a device of the user.

4. The method of claim 1:
    the user receiving the presentation on a presentation device; and
    the registration request comprising an identification of the presentation device.

5. The method of claim 1:
    the device provided to the user by a device source, and
    the registration request received from the device source upon providing the device to the user.

6. The method of claim 1:
    at least one device operated by at least two users; and
    associating the device with the user in the data store comprising: associating the device with the at least two users in the data store.

7. The method of claim 1:
    the at least one capability of at least one unidentified device associated with a device type and a device source; and
    identifying the actions available for the device comprising:
        upon receiving from the device source the actions invokable on devices of the device type and excluding actions that are not invokable on devices of the device type, associating the actions with the unidentified device.

8. The method of claim 7:
    at least one unidentified device not having an association with a device source; and identifying the actions available for the unidentified device comprising:
associating with the unidentified device at least one generic action available for the unidentified device.

9. The method of claim 8:
the unidentified device associated with a device category; and
identifying the actions available for the unidentified device comprising:
associating with the unidentified device at least one device category action available for devices of the device category.

10. The method of claim 1:
at least one device having a device identifier and associated with a device source; and
identifying the actions available for a device having a device identifier comprising:
sending the device identifier to the device source, and
upon receiving from the device source the actions available for the device, associating the actions with the device in the data store.

11. The method of claim 1:
respective devices associated with a device source; and
the presentation associating with an action available for a device a device source reference provided by the device source for the device.

12. The method of claim 1, the instructions configured to, upon receiving from the user an action request to perform an action available for a device, perform the action with respect to the device.

13. The method of claim 1:
associating the device with the user in the data store comprising:
receiving a device state of the device, and
storing the device state in the data store associated with the device; and
presenting a device to the user comprising:
retrieving the device state of the device from the data store, and
presenting the device state of the device to the user.

14. The method of claim 13, at least one action associated with the device state of the device.

15. The method of claim 13, the presentation including at least one advertisement associated with a device state of a device.

16. The method of claim 1:
the user associated with at least one service; and
the presentation to the user including at least one action available for at least one service associated with the user.

17. A system configured to present to a user a set of devices operated by the user, the system having access to a device action service and comprising:
a device registering component configured to, upon receiving from a user a registration request to register a device, associate the device with the user;
a device action identifying component configured to, for an unidentified device that is associated with the user:
identify at least one capability of the unidentified device;
request from the device action service a set of actions invokable on devices having the at least one capability of the unidentified device; and
upon receiving the set of actions from the device action service, associate the set of actions with the unidentified device; and
a device presenting component configured to, upon receiving from a user a presentation request for a presentation of the devices of the user:
present to the user:
the devices associated with the user; and
for the respective devices, the set of actions associated with the device.

18. A memory device comprising instructions that, when executed on a processor of a computer having access to a device action service, cause the computer to present to a user a set of devices, by:
upon receiving from a user a registration request to register a device of a device type, associating the device with the user;
upon failing to identify an unidentified device associated with the user:
identifying at least one capability of the unidentified device;
requesting from the device action service a set of actions invokable on devices having the at least one capability of the unidentified device; and
upon receiving the set of actions from the device action service, associating the set of actions with the unidentified device; and
upon receiving from a user a presentation request for a presentation of the devices of the user:
presenting to the user:
the devices associated with the user; and
for the respective devices, the set of actions associated with the device.

* * * * *